(12) United States Patent
Azizi et al.

(10) Patent No.: US 9,684,742 B1
(45) Date of Patent: Jun. 20, 2017

(54) METHOD AND APPARATUS FOR PERFORMING TIMING ANALYSIS ON CALIBRATED PATHS

(75) Inventors: Navid Azizi, Markham (CA); Joshua David Fender, East York (CA); Ryan Fung, Mississauga (CA)

(73) Assignee: Altera Corporation, San Jose, CA (US)

( * ) Notice: Subject to any disclaimer, the term of this patent is extended or adjusted under 35 U.S.C. 154(b) by 1733 days.

(21) Appl. No.: 12/803,097

(22) Filed: Jun. 18, 2010

Related U.S. Application Data

(60) Provisional application No. 61/275,194, filed on Aug. 26, 2009.

(51) Int. Cl.
G06F 17/50 (2006.01)

(52) U.S. Cl.
CPC ................. *G06F 17/5009* (2013.01)

(58) Field of Classification Search
CPC ...... G06F 1/324; G06F 1/3296; G06F 1/3203; G06F 17/5031; G06F 2217/84; G06F 17/505; G06F 17/5036; G06F 2217/14; G06F 2217/78; H03K 19/0008; H03K 5/133

USPC .................................................... 716/11–116
See application file for complete search history.

(56) References Cited

U.S. PATENT DOCUMENTS

| | | | | |
|---|---|---|---|---|
| 7,571,396 B2* | 8/2009 | Hughes et al. | ................ | 716/100 |
| 7,934,186 B2* | 4/2011 | Sotiriou et al. | ............... | 716/108 |
| 8,286,112 B2* | 10/2012 | Miranda et al. | ............... | 716/110 |
| 2002/0083398 A1* | 6/2002 | Takeyama | ........... | G06F 17/5045 716/102 |
| 2005/0138577 A1* | 6/2005 | Adamian | ............ | G06F 17/5063 716/113 |
| 2005/0235232 A1* | 10/2005 | Papanikolaou | ..... | G06F 17/5045 700/33 |
| 2009/0322376 A1* | 12/2009 | Lamb | .............................. | 326/46 |
| 2010/0083193 A1* | 4/2010 | Mbouombouo | .... | G06F 17/5068 716/132 |

* cited by examiner

*Primary Examiner* — Binh Tat
(74) *Attorney, Agent, or Firm* — L. Cho

(57) ABSTRACT

A method for performing timing analysis on calibrated paths includes performing static timing analysis on the calibrated paths to obtain delay and margin information. The delay and margin information are utilized to emulate operations performed during calibration.

35 Claims, 9 Drawing Sheets

METHOD AND APPARATUS FOR PERFORMING TIMING ANALYSIS ON CALIBRATED PATHS

RELATED APPLICATIONS

This application claims priority to provisional U.S. Patent Application Ser. No. 61/275,194 filed on Aug. 26, 2009 entitled "METHOD AND APPARATUS FOR PERFORMING TIMING ANALYSIS ON CALIBRATED PATHS", the full and complete subject matter of which is hereby expressly incorporated by reference in its entirety.

FIELD

Embodiments of the present invention relate to timing analysis. Specifically, embodiments of the present invention relate to performing timing analysis on calibrated paths on a target device.

BACKGROUND

Static timing analysis (STA) is a method used to compute the expected timing of a digital circuit without the need to perform simulation. Computing the expected timing of a digital circuit is important because it determines if a circuit can operate at a specific clock frequency. STA is also conventionally used as part of other algorithms in the digital circuit design process to help guide design decisions to produce a design that will work at a specified clock frequency.

STA has typically been used instead of simulation because the runtime of STA is orders of magnitude smaller compared to simulation techniques. The runtime is important since obtaining accurate delay information is required by multiple other algorithms for which STA is embedded in. STA is typically used to measure two values for each path that is being analyzed: the setup margin and the hold margin, which refer to the margin available on a signal path for which the signal has to be stable before and after a clock signal arrives.

To account for the operation of the digital design across different operating conditions which affect delay and to guarantee that the design will work across various operating conditions, STA is typically run across many extreme conditions or corners. If the design works at each extreme condition, then under the assumption of monotonic behavior, the design is also qualified for all intermediate points.

In an effort to increase their bandwidth, many interface standards, such as DDR3 and RLDRAM II, have been increasing the data rates that they operate at. To meet the timing requirements and operate at speed at these high data rates electronic devices that use the interface standards are required to calibrate at power-up to reduce skew between signals, and to centre-align clock signals.

As with all other electronic designs, timing analysis needs to occur on these interface standards to compute the expected timing of the interface and determine if the design can operate at the desired clock frequency. While, STA works well in defining the expected timing behavior of a circuit when the topology of the circuit is known, when the topology of the circuit changes during operation (as in the calibration and tracking processes described above), the STA paradigm no longer holds and cannot be used to obtain accurate delay information. Simulation of the design can be used to obtain accurate delay information, but simulation runtimes are orders of magnitude larger than STA. These larger runtimes make simulation unsuitable for real time feedback or optimizations for which STA has typically been used.

One alternative to using simulation to determine the timing analysis of a calibrated path is to first assume that the calibration occurs perfectly, and then to remove certain uncertainties from the analysis. The problem with this methodology is that not every delay uncertainty can be specified, and in particular all of the analysis and data that is performed and used as part of the STA remains unused. Furthermore, this type of analysis does not consider the actual operations that occur within the calibration process and how those affect the delays in the electronic device since no STA calls are performed to obtain accurate delays. Furthermore, this type of analysis cannot consider the effects on timing when the device is operating at multiple operating conditions.

BRIEF DESCRIPTION OF THE DRAWINGS

The features and advantages of embodiments of the present invention are illustrated by way of example and are not intended to limit the scope of the embodiments of the present invention to the particular embodiments shown.

FIG. 6 is a block diagram of a computer system upon which an embodiment of the present embodiment may be implemented on.

SUMMARY

According to an embodiment of the present invention, timing analysis of calibrated paths uses as much of the STA methodology as possible since STA engines include accurate delay information for the IC and know about the relationship between signals. The STA methodology is augmented with information about the operations performed in calibration and tracking as well as the effects of changes in operating conditions. These types of operation allow for timing analysis to remain both quick (as opposed to simulation) and accurate (as opposed to assuming perfect calibration and uncertainty removal), so that it can be used in the optimization process.

Embodiments of the present invention describe a technique that allows for STA to be used as part of the timing analysis of calibrated or dynamic paths within an electronic component. STA, in conjunction with the knowledge of the operations used in the calibration process and along with the effects of changing operating conditions, is used to provide quick and accurate timing analysis.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
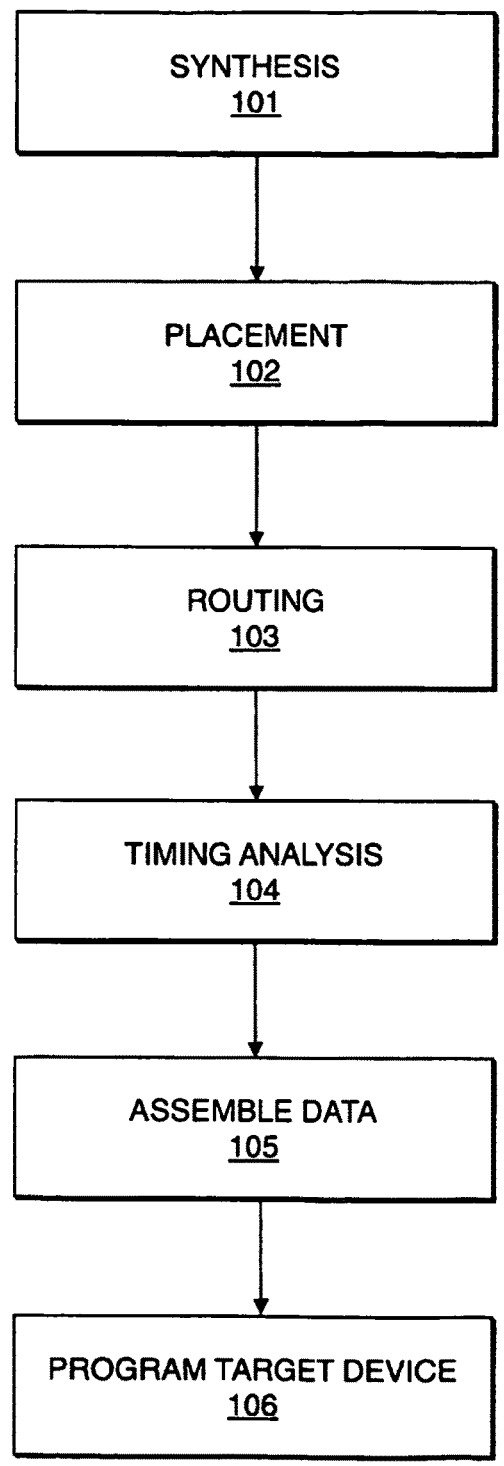
FIG. 1 is a flow chart illustrating a method for designing a system on a target device according to an exemplary embodiment of the present invention.

FIG. 1 is a flow chart illustrating a method for designing a system on a target device according to an exemplary embodiment of the present invention. The target device may be an FPGA, ASIC, a structured ASIC, or other device. At 101, the system is synthesized. Synthesis includes generating a logic design of the system to be implemented. According to an embodiment of the present invention, synthesis generates an optimized logical representation of the system from a HDL design definition. The optimized logical representation of the system may include a representation that has a minimized number of functional blocks and registers, such as logic gates and logic elements, required for the system. Synthesis also includes mapping the optimized logic design (technology mapping). Mapping includes determining how to implement logic gates and logic elements in the optimized logic representation with resources (components) available on the target device. According to an embodiment of the present invention, a netlist is generated from mapping. This netlist may be an optimized technology-mapped netlist generated from the HDL.

At 102, the mapped logical system design is placed. Placement works on the optimized technology-mapped netlist to produce a placement for each of the functional blocks. According to an embodiment of the present invention, placement includes fitting the system on the target device by determining which components on the logic design are to be used for specific logic elements, and other function blocks determined to implement the system as determined during synthesis. Placement may include clustering which involves grouping logic elements together to form the logic clusters present on the target device.

At 103, the placed design is routed. During routing, routing resources on the target device are allocated to provide interconnections between logic gates, logic elements, and other components on the target device. Routability optimization may also be performed on the placed logic design. According to an embodiment of the present invention, the goal of routability optimization is to reduce the amount of wiring used to connect components in the placed logic design. Routability optimization may include performing fanout splitting, logic duplication, logical rewiring, or other procedures. It should be appreciated that one or more of the procedures may be performed on the placed logic design.

At 104, timing analysis is performed on the system. The timing analysis may include a static timing analysis on various portions of the system. Timing analysis may include the computation of slack for the various portions on the system. The slack may be used to compute setup, hold, recovery, removal, and other types of timing requirements.

According to one embodiment, slack may refer to the difference between the data arrival time (including skew and microparameters) and the data required time. The slack may be computed after synthesis, placement, or routing in order to confirm that the design for the system meets timing requirements and/or to evaluate solutions generated by the synthesis, placement, or routing. Timing analysis may further include procedures that perform timing analysis on calibrated paths.

According to an embodiment of the present invention, timing analysis 104 includes obtaining accurate timing analysis of paths that are calibrated at runtime, and optionally tracked throughout operation. The method combines conventional static timing analysis with new methods and procedures to obtain a timing analysis that considers the effects of calibration at runtime, the effects that degrade the purpose of calibration over the operation of the device, and improvements to timing margins by calibrating out the process portion of variations on external devices.

According to an embodiment of the present invention, parameters in timing analysis that are not static are accounted for. These parameters reflect the effects of calibration and changes in the operating conditions during runtime. The parameters may also reflect calibrating out process variations in external devices.

At 105, an assembly procedure is performed. The assembly procedure involves creating a data file that includes information determined by the compilation procedure described by 101-104. The data file may be a bit stream that may be used to program a target device. According to an embodiment of the present invention, the procedures illustrated in FIG. 1 may be performed by an EDA tool executed on a first computer system. The data file generated may be transmitted to a second computer system to allow the design of the system to be further processed. Alternatively, the data file may be transmitted to a second computer system which may be used to program the target device according to the system design. It should be appreciated that the design of the system may also be output in other forms such as on a display device or other medium.

At 106, the target device is programmed with the data file. By programming the target with the data file, components on the target device are physically transformed to implement the system.

Figure 2:
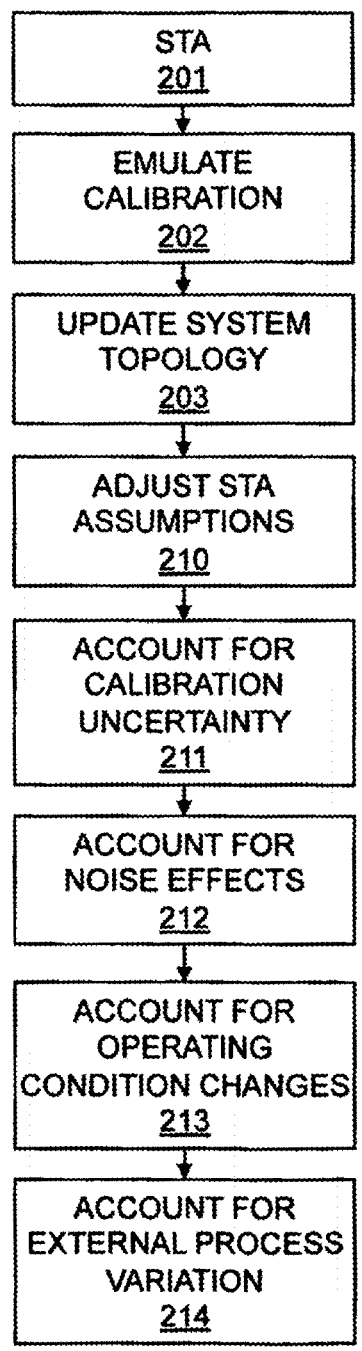
FIG. 2 is a flow chart illustrating a method for performing timing analysis that analyzes calibrated paths according to a first embodiment of the present invention.

FIG. 2 is a flow chart illustrating a method for performing timing analysis that analyzes calibrated paths according to an embodiment of the present invention. The method illustrated in FIG. 2 may be implemented at 104 in FIG. 1. The method illustrated improves the accuracy of timing analyzing dynamic or calibrated paths with approximately the same runtime as STA by building upon the STA methodology to include both the effects of calibration, and the effects of changes in operating conditions. According to an embodiment of the present invention, an electronic design automation tool uses a methodology that generates a timing analysis of calibrated paths that uses uncertainties that are looked up and added together to obtain timing margins. This methodology may utilize an STA engine to the extent possible, and augments it with procedures to consider calibration that will be performed on the system by a target device and operating condition and other effects of calibration.

At 201, STA is performed. According to an embodiment of the present invention, a standard STA engine is used to obtain actual delays for different paths at different temperature and voltage corners as well as for different speed-grades. These types of delays allows for the derivation of specific delay information for effects such as rise/fall imbalance (RF), within-die variation as well as aging for specific topologies that are not available in the previous methodology.

At 202, calibration operations are emulated. According to an embodiment of the present invention, the emulation of calibration operations includes performing post-processing after STA analysis. When actual calibration is performed on a system by a target device, the topology of the paths become dynamic and change when the device is put into operation. This makes the STA inaccurate or incomplete. The calibration on the target device may involve adding or subtracting delays to a path or modifying phase lock loops. According to an embodiment of the present invention, calibration may include other operations that optimize timing.

At 203, the topology of the system is updated to reflect the calibration operations in hardware that have been emulated at 202.

According to an embodiment of the present invention, a single iteration of STA is performed at 201 and a single iteration of emulation is performed at 202 where the delay and margin data generated at STA is post-processed to approximate what occurs in calibration.

Figure 3:
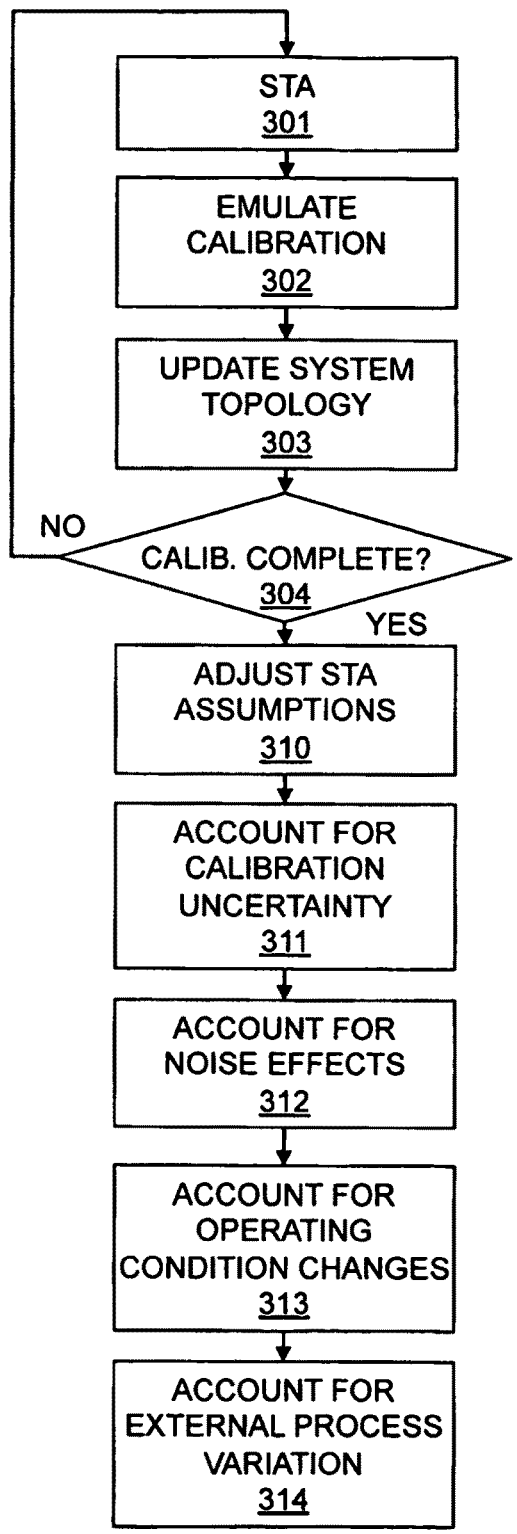
FIG. 3 is a flow chart illustrating a method for performing timing analysis that analyzes calibrated paths according to a second embodiment of the present invention.

FIG. 3 illustrates an alternate embodiment of the present invention. FIG. 3 is a flow chart illustrating a method for performing timing analysis that analyzes calibrated paths according to a second embodiment of the present invention. Similar to the procedure illustrated in FIG. 2, the procedure in FIG. 3 performs STA at 301. However, the STA procedure is integrated within a loop that emulates calibration of operations to be performed on the system by the target device. Pseudo-code that may be used to implement this procedure is shown below.

```
while (~calibration_done) {
    delays = run STA
    calibration_done = calibration_algorithm(delays)
}
```

At 302, calibration operations are emulated. The emulation of calibration operations includes performing post-processing after STA analysis. According to an embodiment of the present invention, the delays obtained through STA at 301 are input into a procedure that emulates the calibration process on hardware.

At 303, the system topology is updated to reflect the calibration emulated at 302.

At 304, it is determined whether the calibration is complete. According to an embodiment of the present invention, calibration may be determined to be complete when timing of signals in the system is determined to comply with system requirements. It should be appreciated that other criteria may be used. If calibration is complete, control proceeds to 310. If calibration is not complete, control returns to 301.

When returning to 301, STA is performed again to re-evaluate the system to provide new delays. According to an embodiment of the present invention, the procedures of 301-304 iterates until calibration as emulated at 302 completes providing for final timing values for the paths of interest. The benefits of performing such an analysis are that the STA procedure is being used to obtain all the delays and thus includes all the accuracy and runtime benefits of using STA. According to an embodiment of the present invention, the procedure used to emulate calibration at 302 is given the requirement of converging within a short period of time.

As an example, consider the case of read capture timing analysis for a DDR3 memory interface. DDR3 memory interfaces can run at high data rates that include many parallel signals. In the case of DDR3, read capture refers to the memory returning a data word to the interfacing device which has to capture the data correctly. The read capture occurs when the strobe signal (DQS) from the memory is used to clock the data signals (multiple DQ signals) which also are from the memory. The read capture path can be very timing critical since there may be significant skews between various DQ pins causing the valid window, where the DQS strobe can clock the data, to shrink or be non-existent. Furthermore, even with the availability of a valid window, the DQS strobe may not have an appropriate delay to be in that valid window. Per bit deskew is a calibrating procedure for which delays on different DQ signal paths on the interfacing device are calibrated to make each of the DQ signal paths approximately equal in delay to one another, and at the same time place the DQS strobe in the middle of the valid window. The hardware calibrating procedure of achieving that goal includes increasing and decreasing delays on each signal path until the read capture fails and then picking a midpoint delay value.

When running timing analysis on the read capture, STA 301 will provide delays of the default configuration, and the procedure call that emulates the calibration procedure 302 can read the delays and choose to increase or decrease delays on each signal path to provide the same effect as is occurring in hardware.

Referring back to FIG. 2, the calibration emulation procedure described in FIG. 2 will be completed faster than the calibration emulation procedure described with reference to FIG. 3, since there is only a single iteration of STA or one call to STA. The emulation calibration procedure described with reference to FIG. 2 may be less accurate since the precise delay effects of changing the topology are not accounted for. However, in some instances, the method of FIG. 2 is preferred due to its performance benefits.

Referring back to the calibration emulation example given with reference to FIG. 3 with the DDR3, the single STA iteration or call will provide default delays for each of the DQ signal paths. Using these delays, the extra delay that is added during calibration to each signal path to make the paths relatively equal in delay and to centre the DQS strobe can be estimated. Using these estimates the timing analysis can emulate the hardware calibration.

Using a type of analysis where only a single STA iteration is used to obtain estimates of how the delays will change after calibration may seem to introduce some uncertainty in the timing analysis since not all the delays in the IC are known exactly. However, this may not be an issue since calibration algorithms are used in hardware devices when delay information is known to be incomplete. In these cases, the amount of delay uncertainty may not negatively affect the timing analysis since the calibration algorithm may calibrate to a near optimum point and the calibration emulation assumes the same.

At 210, STA assumptions are adjusted. In conventional STA, each delay on the target device implement on an integrated circuit (IC) is modeled as a pair: a minimum value and a maximum value. The minimum and maximum values represent the range of delays that can occur for a specific path due to various factors such as within-die (WID) variations or the effects of aging. When STA is run, the value which provides for the worst-case margin is used. For example, when timing analyzing the setup margin the maximum value of the data path is used and the minimum value of the clock path is used. On the other hand, when timing analyzing the hold margin, the minimum value of the data path is used and the maximum value of the clock path is used.

For a single path, the setup and hold margins use opposite ends of the range of delays. While this scenario cannot happen in practice on a single IC (the data path delay will either be towards the maximum or the minimum but not both), the same path on different ICs can have different delays and thus it is appropriate to timing analyze the path. The effect of using the range of values to represent each delay is that the difference between the minimum and maximum value is removed from the total margin (the combination of setup and hold margin).

During the timing analysis of calibrated paths, the delay and margin information obtained from the STA engine will implicitly contain the minimum and maximum values for each delay arc. However, using both the minimum and maximum values in computing different margins is pessimistic when considering calibrated paths. The purpose of calibration is to remove the uncertainty in the delay of a path and to pick the circuit topology that best meets the requirements. Thus, when considering the delay of a path after calibration, the path should no longer be considered to have a range of delays but a single delay.

To remove the pessimism that is inherent in using delay values obtained from the STA engine, the difference in delay between the maximum/minimum delay and nominal delay of the paths used to calculate the setup and hold margin should be added to the margin calculated. This procedure emulates the process of calibrating out the WID variation on the IC. Consider a path that has a nominal delay of 1ns, with a minimum delay of 0.95 ns and a maximum delay of 1.05 ns. When considering the setup slack, the maximum delay of 1.05 ns is used instead of 1ns, and thus the setup slack is reduced by 0.05 ns. Similarly when considering the hold slack, the minimum delay of 0.95 ns is used instead of 1ns, and thus the hold slack is reduced by 0.05 ns. When this same path is timing analyzed as part of a calibrated path analysis, the values provided by the STA tool (either 0.95 ns or 1.05 ns depending on if the setup slack or hold slack is being calculated) will be pessimistic since the calibrated path will have a single calibrated delay. Thus to remove the pessimism based on the assumptions in the STA engine, the range of delays due to WID variations or other effects (which is 0.05 ns in the example above) should be added to the setup and hold slacks determined after calibration.

At 211, calibration uncertainty is accounted for in the delay and margin processed from the calibration operation emulation. According to an embodiment of the present invention, the calibration uncertainty may include quantization error. Referring back to the example of the memory interface, the unknown delays include the delays between the memory and the interfacing IC, as well as delays on the memory. Since the delay information is not known a priori, the timing analysis of the calibrated paths using STA is working on incomplete data. Not having this information available may cause the calibration operations occurring in the timing analysis to pick different topologies than what would actually occur in hardware. These differences between what can occur in hardware and what occurs in the timing analysis are quantified and included in the timing analysis of calibrated paths. In most cases, hardware calibration processes are changing delays on various signal paths and are doing so in specific increments or quanta. When increasing delays with specific increments, the calibration algorithm can result in delays that, in the worst-case, are offset from the optimal delay by the delay increment divided by 2. The delay increments can come from various sources including delay chains (where the quantization error is the delay chain step) and PLL phases (where the quantization error is the minimum PLL adjustment). In both cases, during the timing analysis of the calibrated path, the worst-case quantization error must be assumed and removed from all timing margins produced.

At 212, the effects of noise is accounted for on the delay and margin processed from the calibration operation emulation. According to an embodiment of the present invention, the effects of noise that is accounted for includes the effects of jitter. Jitter is the time variation of signals as is a result of complex interactions of signals in an IC. The method for correctly accounting for jitter in timing analysis depends on the calibration procedure used. Calibration procedures that take many samples and use the mean to decide to make a change in the topology of a system remove the effects of jitter in their decisions. For this case, the worst-case jitter effect on setup and hold margins will be half of the total jitter. Alternatively, if the calibration procedure takes a few samples in its analysis, it may have used an errant timing signal to make its decision and thus calibrate non-optimally. For this case, the timing analysis must assume that it calibrated at a non-optimal location and remove the full jitter from both the setup and hold margin.

At 213, the effects of changes in operating conditions of a system are accounted for on the delay and margin processed from the calibration operation emulation. Changes in operating conditions can cause timing margins to change, and thus in the conventional timing analysis, STA is run at multiple corners to consider the effects of different operating conditions. However, the timing analysis of calibrated paths cannot use the methodology used in conventional STA to account for operating condition variations since there are two different times at which operating conditions matter, at calibration time and after calibration time. Since the STA methodology is being changed to consider the effects of calibration on the path it is analyzing, the operating condition that is being used during timing analysis must be the operating condition during calibration. Further derating factors are thus needed in the timing analysis to account for variations in operating conditions after calibration.

According to an embodiment of the present invention, variations in operating conditions that are of interest are typically grouped into three different types: process variations (P), voltage variations (V), and temperature variations (T). These together compose PVT variations. The maximum P variation can be determined by comparing different dies, while the maximum V and T variations can be determined by operating a design at the endpoints of the range of voltage and temperature.

There are, however, some distinguishing characteristics between the three types of variations. In the first order P variations do not change once the chip has been fabricated, while V and T variations change over time. In addition T variations are typically low-frequency changes that gradually shift through the operation of the electronic device, while V variations can be either low-frequency changes that gradually change over time, or high-frequency changes that manifest themselves as jitter.

According to an embodiment of the present invention, when considering operating condition variations, only the low-frequency voltage and temperature (VT) variations are considered, as process variations do not change with time, and high-frequency jitter effects were considered during calibration emulation. To simplify the analysis, an assumption is made that the VT changes affect all the signal paths on the die (i.e. there is no VT gradient across the die) and that the delays in the path scale similarly with changes in VT. These assumptions may not be true in practice, but will cause secondary and minor effects in the timing analysis, and are considered below.

To determine the derating factors that need to be applied to the timing analysis, two values need to be defined/found, 1) the variation in delay as a percentage, due to VT variations, and 2) the maximum absolute change in delay due to calibration. According to an embodiment of the present invention, the variation in delay, as a percentage, due to the variation in VT is usually a function of the silicon process that the digital device has been manufactured on, and the allowed range of voltage and temperature in which the device can operate. This value is manufacturer-specific, and can be determined for each product line and stored and looked up during the timing analysis. According to an embodiment of the present invention, the maximum change in delay due to calibration is defined as the largest change in delay of a signal path as a result of calibration. This value can be determined from the calibration algorithm and the hardware where the calibration is running on and stored and looked up during timing analysis.

These values can be determined as part of procedures that the timing analysis algorithm calls for each type of calibrated path that it is analyzing. There are a number of ways to implement such a feature such as a lookup table, but an assumption can be made that each signal path on a device can have associated with it two procedures that return the above values. For uncalibrated paths, the return values would be 0.

Once both are determined, the derating value can be calculated as the percentage change in delay multiplied by the maximum change in delay due to calibration. The reason that only the maximum change in delay due to calibration should be used and not the total delay is that STA will, by definition, cover for variations in delays that are from topologies that are static and do not change during calibration by running the STA in multiple corners. The changes in delay due to changes in operating conditions of the calibrated portions of the design are not included anywhere in traditional STA analysis, but are included here.

As an example, consider that VT variations can cause +/−x=5% variation in delay, and that the maximum change in delay due to calibration is 1 ns. In this case, 10%=2×5% of 1 ns=100 ps must be removed from every margin result. In this case 10% is used instead of 5% since calibration can occur in one operating condition extreme, and then over time the device may be operating in the opposite operating condition extreme.

The above analysis is somewhat pessimistic in that is assumes that delays that are being added in calibration are added to achieve some absolute delay, and in these cases the variation in delay found above need to removed from all margins. However, in cases where the calibration process is adding delays to achieve a relative delay to some other signal path, then VT variations on the additional delay will track with the rest of the device, and thus do not need to be derated. To remove this pessimism, procedures which timing analysis uses or calls to determine the maximum delay increase due to calibration need to be upgraded to only return the maximum delay increase that does not track with the rest of the device.

As mentioned above, the analysis of operating conditions assumed that VT changes affect all the signal paths on the die and that the delays in the path scale similarly with changes in VT. These assumptions may not be true in practice, but were not considered above since they cause secondary effects. To remove the dependence on this assumption a further derating factor can be included in the timing analysis. To determine this further derating factor, a further correlation value (in addition to the variation in delay due to VT variations and the maximum absolute change in delay) must be defined for each pair of paths. This correlation value represents the correlation in operating conditions between two paths, and can be used to calculate the derating factor for calibrated paths who do not share the same VT conditions as follows. The correlation value is subtracted from 1 (perfect correlation) and multiplied by the VT variation derating factor found above to find the further derating factor due to differences in VT conditions. For example, if the correlation value was 0.95 and the change in delay due to operating conditions was found to be 100 ps (as above), a further derating factor of (1−0.95)*100 ps=5 ps would need to be removed from every margin result.

Changes in operating conditions after calibration can reduce much of the margin improvement obtained through calibration. To remove the margin loss due to changes in operating conditions, some ICs contain tracking algorithms in addition to calibration algorithms. Tracking algorithms track changes in operating conditions and change the circuit topology during circuit operation, as opposed to calibration algorithms which solely change circuit topology before circuit operation.

To timing analyze paths that are subject to both calibration and tracking, instead of derating the timing analysis due to changes in operating conditions as described above, a tracking uncertainty value is removed from every margin reduced. The tracking uncertainty is a function of the tracking algorithm. According to an embodiment of the present invention, for tracking algorithms that continuously update the circuit topology, the tracking uncertainty term will be close to 0. For tracking algorithms who update the circuit topology periodically, the tracking uncertainty will be larger. The tracking uncertainty for each tracking algorithm needs to be determined a priori and stored, and the timing analysis can look up the value and remove the uncertainty from every margin produced.

At 214, the effects of external process variations are accounted for on the delay and margin processed from the calibration operation emulation. While calibrated paths can be used in any part of an integrated circuit, when they are used to interface one integrated circuit (IC) to another IC (such as a memory), the timing analysis of those paths can be further upgraded to consider the effects where the process variation in the other device is calibrated out by the calibration. Typically external components provide specifications for their parts that comprise all types of variations. Without considering what types of variations can be removed through calibration, the timing analysis would be quite pessimistic leading to limitations in the operating speed that one would think they could operate.

Typically, when one IC (P1) is produced, the manufacturer also produces a report providing for specifications for P1, including setup and hold times of registers on their input paths and worst-case skews on their output paths. These specifications include the process variations from one die to another along with the voltage and temperature variations that occur during operation. According to an embodiment of the present invention, these specifications may then be used in the timing analysis of the second IC (P2) that is interfacing to P1 as input and output delays.

Using the whole specification in the timing analysis of calibrated paths, however, is pessimistic since calibrated paths can calibrate to the specific process variation of the P1 device that it is interfacing to. In other words, as the path is being calibrated, it can calibrate out the process portion of the specification since it is only being connected to one die.

In these cases, if the percentage of the specification of P1 that are due to process variations are known, then that portion of the specification can be added to the timing margin obtain from the timing analysis to increase the margin. For example, consider the tDQSQ specification of a DDR3 interface which represents the worst-case skew when data is being output: tDQSQ is specified at 150 ps at 533 MHz. However, if it is known that 40% of the specification is due to process variations in the memory, then an additional 60 ps can be added to the margins of the paths interfacing to the memory, if and only if they are calibrated paths.

According to an embodiment of the present invention, this type of analysis is used to allow the timing analysis of calibrated paths to be made more accurate by considering the types of variation on other devices to which it is calibrating to. Without considering these types of effects, the timing analysis would be quite pessimistic leading to limitations in the operating speed that one would think they could operate at.

Referring to the method for performing timing analysis in FIG. 3, procedures 310-314 may be performed similarly to procedures 210-214 described with reference to FIG. 2. It should be appreciated that delays and margins information is generated, updated, and/or passed between each of the procedures performed at 201-203, 210-214, 301-304, and 310-314 in FIGS. 2 and 3.

The static timing analysis described with reference to FIGS. 2 and 3, which consider the effects of calibration on timing analysis, may be run for a number of different corners, as in conventional STA analysis. There are, however, differences between the two. For example, in conventional STA, the design is analyzed at many extreme corners and the assumption of monotonic behavior is used to qualify all intermediate points. The corner that STA is run on during calibrated path timing analysis is the operating condition during calibration. As with conventional static timing analysis, the design is analyzed at many extreme corners (i.e. calibration occurs in different corners) and the assumption of monotonic behavior is used to qualify all intermediate points. The corners that are picked are cases where circuits can be faster or slow than nominal including low temperatures/high voltage with fast devices and high temperatures/low voltage with slow devices. In some cases, due to temperature inversion effects, where devices slow down at low temperatures, other corners must also be included such as low temperature/low voltage with slow devices. As ICs are manufactured at lower process nodes, further corners may be needed to define the space. As previously described, the operating condition changes after calibration are treated differently.

Figure 4:
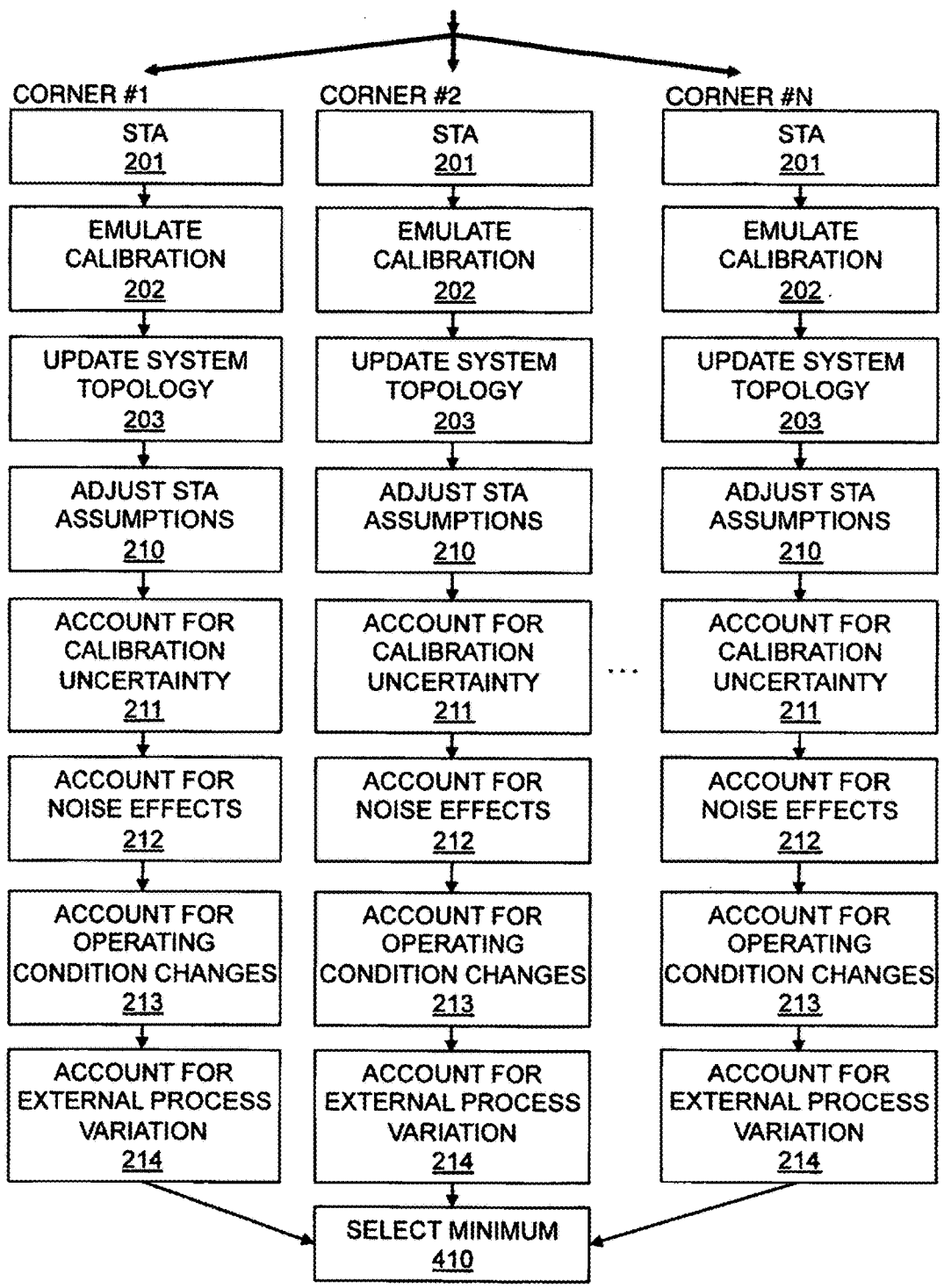
FIG. 4 is a flow chart illustrating a method for performing timing analysis that analyzes calibrated paths on a plurality of corners according to a first embodiment of the present invention.

FIG. 4 is a flow chart illustrating a method for performing timing analysis that analyzes calibrated paths on a plurality of corners according to a first embodiment of the present invention. The method illustrated in FIG. 4 utilizes the method described in FIG. 2. At 410, after timing analysis is performed at each of the N corners, the minimum delay and margin values are selected. According to an embodiment of the present invention, the minimum delay and margin values may be minimum slack values.

Figure 5:
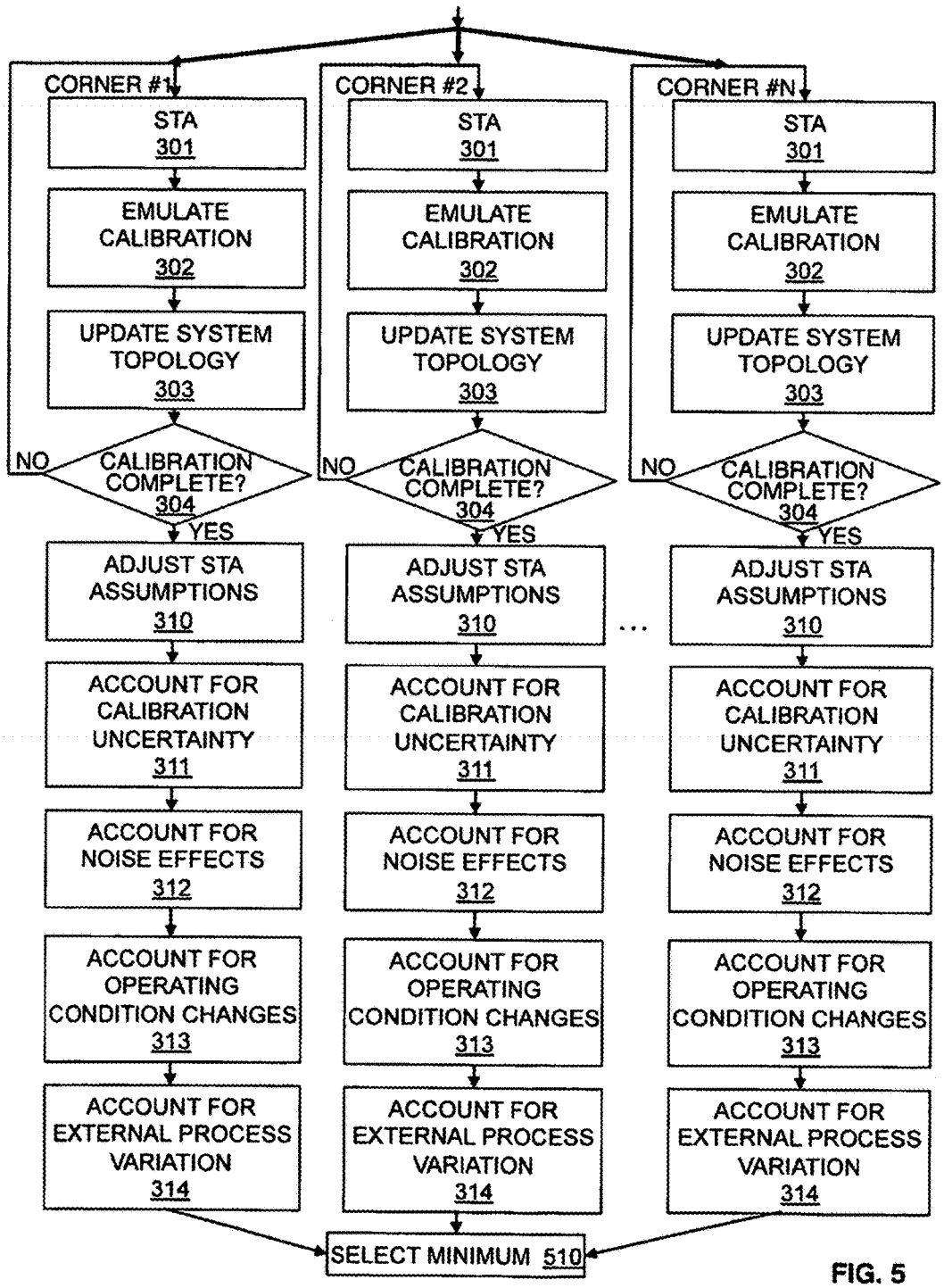
FIG. 5 is a flaw chart illustrating a method for performing timing analysis that analyzes calibrated paths on a plurality of corners according to a second embodiment of the present invention.

FIG. 5 is a flow chart illustrating a method for performing timing analysis that analyzes calibrated paths on a plurality of corners according to a second embodiment of the present invention. The method illustrated in FIG. 5 utilizes the method described in FIG. 3. At 510, after timing analysis is performed at each of the N corners, the minimum delay and margin values are selected. According to an embodiment of the present invention, the minimum delay and margin values may be minimum slack values.

FIGS. 1-5 are flow charts that illustrate embodiments of the present invention. Some of the techniques illustrated may be performed sequentially, in parallel or in an order other than that which is described and that the procedures described may be repeated. It should be appreciated that not all of the techniques described are required to be performed, that additional techniques may be added, and that some of the illustrated techniques may be substituted with other techniques.

In an effort to increase bandwidth, many integrated circuits (ICs) and electronic standards, such as memory interface standards, have been increasing the data rates that they operate at. To meet timing at these high data rates ICs interfacing with other ICs are required to calibrate at power-up to reduce skew between signals, to centre-align clock and strobe signals and perform other operations.

Timing analyzing paths which are calibrated do not strictly meet the static timing analysis paradigm used predominately in conventional EDA tools. Timing analyzing paths without considering calibration will be too pessimistic, and assuming that calibration is perfect is optimistic as voltage and temperature variations over time will affect how well the device is calibrated. Embodiments of the present invention address these issues.

Embodiments of the present invention provide for accurate and fast timing analysis of paths that are calibrated. This allows for the determination of whether a design will operate at the required speed and the optimization of the design. Embodiments of the present invention 1) allow STA engines which hold accurate delay information to be used to time analyze calibrated paths, 2) produces timing reports for calibrated paths that consider the effects of calibration accurately and quickly, and 3) produces timing reports for calibrated paths that consider the effects of operating condition variations both during calibration time and after calibration time.

It should be appreciated that embodiments of the present invention may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 6:
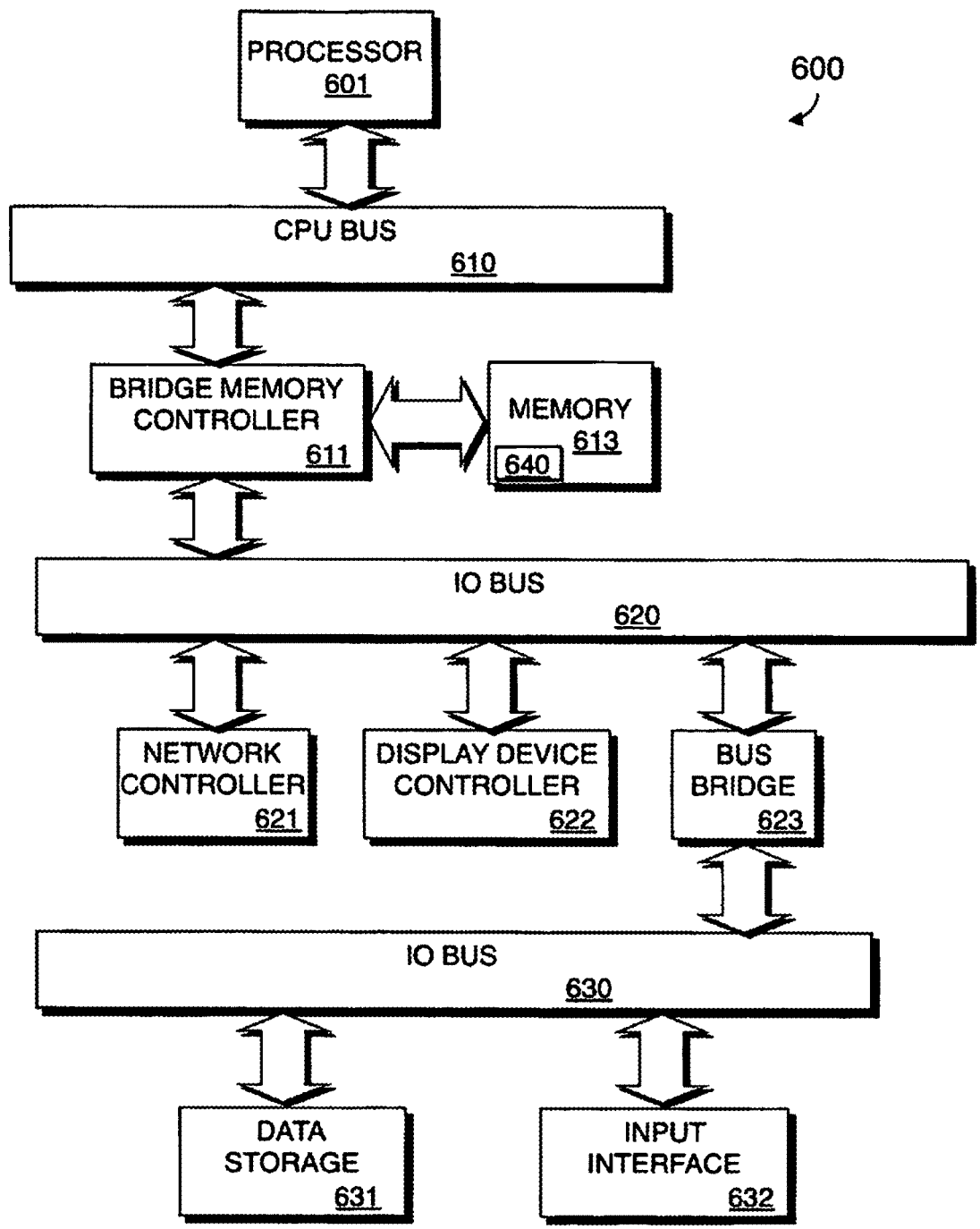

FIG. 6 illustrates a block diagram of a computer system 600 implementing a system designer 640 according to an embodiment of the present invention. The computer system 600 may include one or more processors that process data signals. As shown, the computer system 600 includes a processor 601. The processor 601 is coupled to a CPU bus 610 that transmits data signals between the processor 601 and other components in the computer system 600.

The computer system 600 includes a memory 613. The memory 613 may be a dynamic random access memory device, a static random access memory device, and/or other memory device. The memory 613 may store instructions and code represented by data signals that may be executed by the processor 601. A bridge memory controller 611 is coupled to the CPU bus 610 and the memory 613. The bridge memory controller 611 directs data signals between the processor 601, the memory 613, and other components in the computer system 600 and bridges the data signals between the CPU bus 610, the memory 613, and a first IO bus 620.

The first IO bus 620 may be a single bus or a combination of multiple buses. The first IO bus 620 provides communication links between components in the computer system 600. A network controller 621 is coupled to the first IO bus 620. The network controller 621 may link the computer system 600 to a network of computers (not shown) and supports communication among the machines. A display device controller 622 is coupled to the first IO bus 620. The display device controller 622 allows coupling of a display device (not shown) to the computer system 600 and acts as an interface between the display device and the computer system 600.

A second IO bus 630 may be a single bus or a combination of multiple buses. The second IO bus 630 provides communication links between components in the computer system 600. A data storage device 631 is coupled to the second IO bus 630. The data storage device 631 may be a hard disk drive, a floppy disk drive, a CD-ROM device, a flash memory device or other mass storage device. An input interface 632 is coupled to the second IO bus 830. The input interface 632 allows coupling of an input device to the computer system 600 and transmits data signals from an input device to the computer system 600. A bus bridge 623 couples the first IO bus 620 to the second IO bus 630. The bus bridge 623 operates to buffer and bridge data signals between the first IO bus 620 and the second IO bus 630. It should be appreciated that computer systems having a different architecture may also be used to implement the computer system 600.

A system designer 640 may reside in memory 613 and be executed by the processor 601. According to an embodiment of the present invention, the system designer 640 performs accurate timing analysis of paths that are calibrated at runtime, and that are optionally tracked throughout operation. The system designer utilizes conventional static timing analysis with new procedures to obtain a timing analysis that considers the effects of calibration at runtime, the effects that degrade the purpose of calibration over the operation of the device, and improvements to timing margins by calibrating out the process portion of variations on external devices.

According to an embodiment of the present invention, the system designer 640 performs accurate timing analysis of paths that are calibrated at runtime, and that are optionally tracked throughout operation. The system designer utilizes conventional static timing analysis with new procedures to obtain a timing analysis that considers the effects of calibration at runtime, the effects that degrade the purpose of calibration over the operation of the device, and improvements to timing margins by calibrating out the process portion of variations on external devices.

Figure 7:
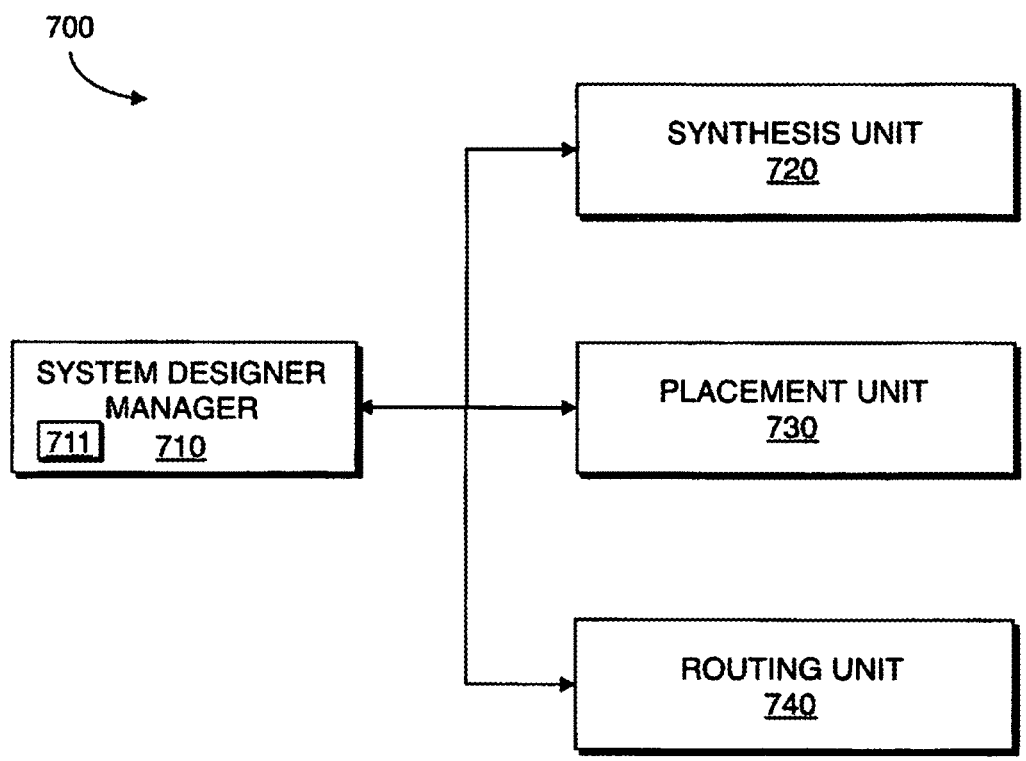
FIG. 7 is a block diagram of a system designer according to an embodiment of the present invention.

FIG. 7 illustrates a system designer 700 according to an exemplary embodiment of the present invention. The system designer 700 may be used to implement the system designer 640 shown in FIG. 6. The system designer 700 may be an EDA tool for designing a system on a target device. The target device may be, for example, an application specific integrated circuit (ASIC), a structured ASIC, a field programmable gate array (FPGA), a programmable logic device (PLD), a printed circuit board (PCB), or other circuitry. FIG. 7 illustrates modules implementing an embodiment of the system designer 700. According to one embodiment, system design may be performed by a computer system, such as computer system 600 (shown in FIG. 6), executing sequences of instructions represented by the modules shown in FIG. 7. Execution of the sequences of instructions causes the computer system to support system design as will be described hereafter. In alternate embodiments, hard-wire circuitry may be used in place of or in combination with software instructions to implement the present invention. Thus, the present invention is not limited to any specific combination of hardware circuitry and software. The system designer 700 includes a system designer manager 710. The system designer manager 710 is connected to and transmits data between the components of the system designer 700.

Block 720 represents a synthesis unit. The synthesis unit 720 generates a logic design of a system to be implemented in the target device. According to an embodiment of the system designer 700, the synthesis unit 720 takes a conceptual Hardware Description Language (HDL) design definition and generates an optimized logical representation of the system. The optimized logical representation of the system generated by the synthesis unit 720 may include a representation that has a minimized number of functional blocks and registers, such as logic gates and logic elements, required for the system. Alternatively, the optimized logical representation of the system generated by the synthesis unit 720 may include a representation that has a reduced depth of logic and that generates a lower signal propagation delay. The synthesis unit 720 also determines how to implement the functional blocks and registers in the optimized logic representation utilizing specific resources on a target device thus creating an optimized "technology-mapped" netlist. The technology-mapped netlist illustrates how the resources (components) on the target device are utilized to implement the system. In an embodiment where the target device is a FPGA, the components could be logical elements or adaptive logic modules. In an embodiment where the target device is an ASIC, the components could be gates or standard cells. In an embodiment where the target device is a structured ASIC, the technology-mapped netlist may contain components that can be implemented in the structured ASIC fabric, such as RAM blocks, multiplier blocks, and gates from a library of gates.

Block 730 represents a placement unit. The placement unit 730 places the system on to the target device by determining which components or areas on the target device are to be used for specific functional blocks and registers. According to an embodiment of the system designer 700, the placement unit 730 first determines how to implement portions of the optimized logic design in clusters. Clusters may represent a subset of the components on the logic design. A cluster may be represented, for example, by a number of standard cells grouped together. In this embodiment, after portions of the optimized logic design are implemented in clusters, the clusters may be placed by assigning the clusters to specific positions on the target device. The placement unit 730 may utilize a cost function in order to determine a good assignment of resources on the target device.

Block 740 represents a routing unit. The routing unit 740 determines the routing resources on the target device to use to provide interconnection between the components implementing functional blocks and registers of the logic design.

The system designer manager 710 includes a timing analysis unit 711. The timing analysis unit 711 performs accurate timing analysis of paths that are calibrated at runtime, and are optionally tracked throughout operation. The timing analysis unit 711 utilizes conventional static timing analysis with new procedures to obtain a timing analysis that considers the effects of calibration at runtime, the effects that degrade the purpose of calibration over the operation of the device, and improvements to timing margins by calibrating out the process portion of variations on external devices as described above.

Figure 8:
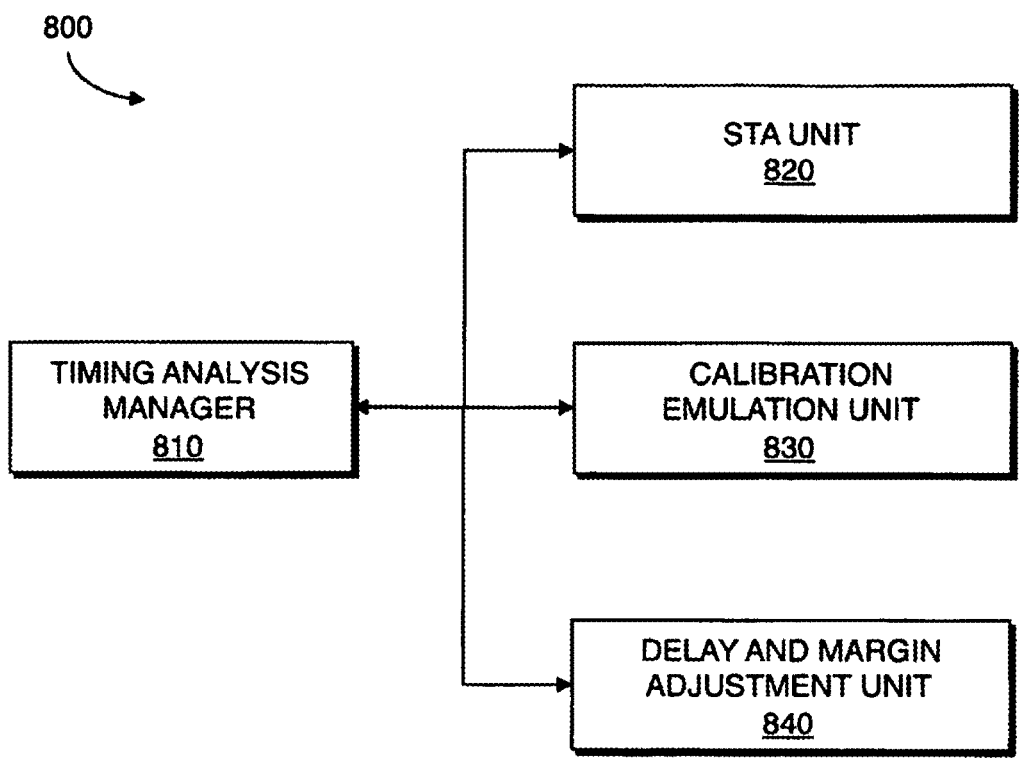
FIG. 8 is a block diagram of a timing analysis unit according to an embodiment of the present invention.

FIG. 8 is a block diagram of a timing analysis unit 800 according to an embodiment of the present invention. The timing analysis unit 800 may be used to implement the timing analysis unit 711 shown in FIG. 7. The timing analysis unit 800 includes a timing analysis manager 810. The timing analysis manager 810 is connected to and transmits data between the components of the timing analysis unit 800.

Block 820 represents an STA unit. The STA unit 820 computes actual delays and margins for different paths on the system at different temperature and voltage corners as well as for different speed-grades. These types of delays allows for the derivation of specific delay information for effects such as rise/fall imbalance (RF), within-die variation as well as aging for specific topologies that are not available in the previous methodology.

Block 830 represents a calibration emulation unit. The calibration emulation unit 830 emulates calibration operations performed on the system by the target device. According to an embodiment of the present invention, the emulation of calibration operations includes performing post-processing after STA analysis. When actual calibration is performed on a system by a target device, the topology of the paths become dynamic and change when the device is put into operation. This makes the STA results inaccurate or incomplete. By performing emulation on calibration operations performed on the system by a target device, updated delay and margin for the paths may be computed.

Block 840 represents a delay and margin adjustment unit 840. The delay and margin adjustment unit 840 makes further adjustments to the delay and margin of the paths on the system by taking into account of adjustments of STA assumptions, calibration uncertainty, noise effects, operating condition variations, and external process variations. The delay and margin adjustment unit 840 may include an STA assumption adjustment unit to perform the procedures performed at 210, a calibration uncertainty adjustment unit to perform the procedures performed at 211, a noise effects adjustment unit to perform the procedures performed at 212, an operating condition change adjustment unit to perform the procedures performed at 213, and a external process variation adjustment unit to perform the procedures performed at 214 (all shown at FIG. 2).

Figure 9:
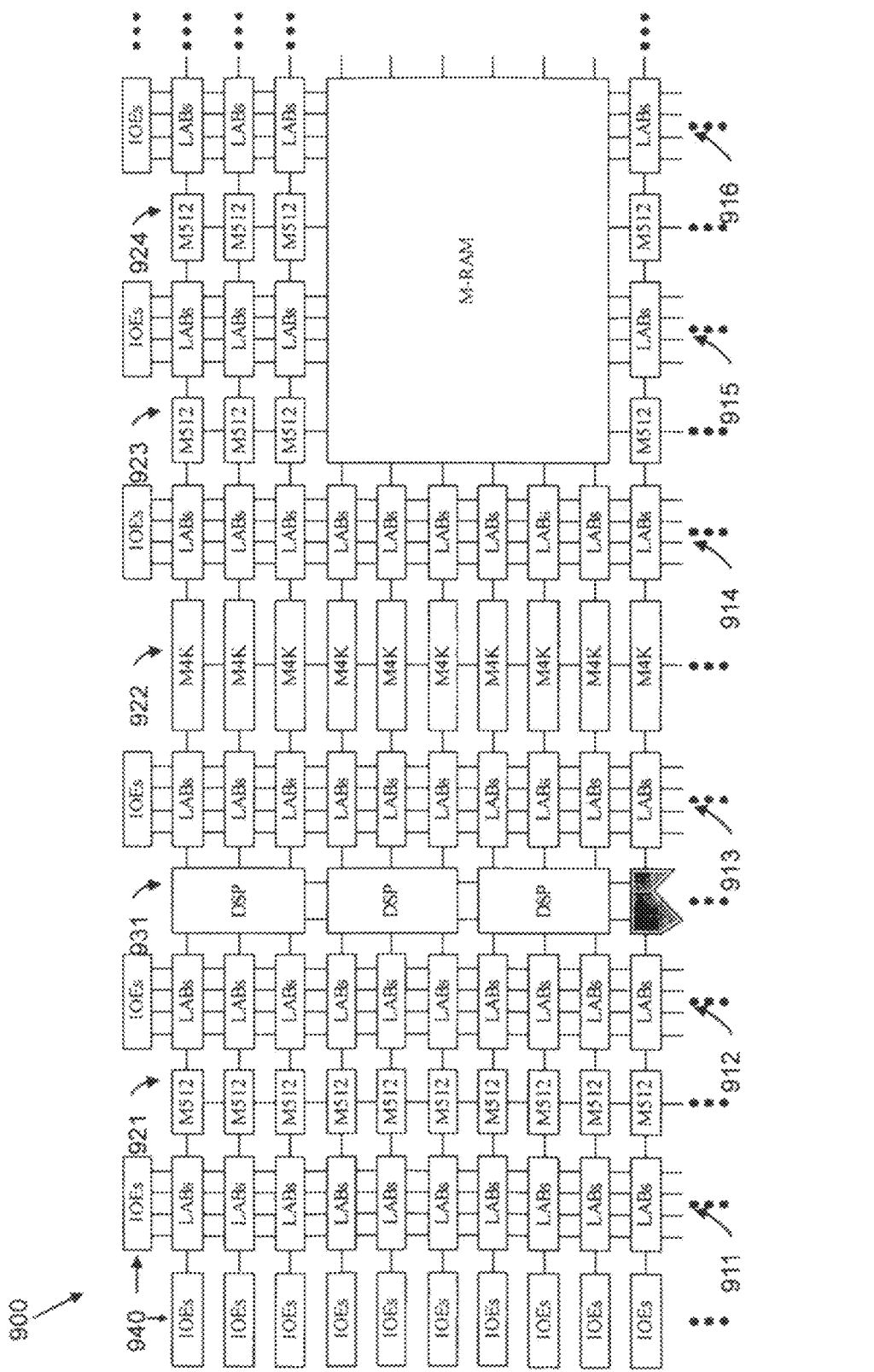
FIG. 9 illustrates an exemplary target device according to an embodiment of the present invention.

FIG. 9 illustrates a target device according to an embodiment of the present invention. The target device 900 includes a plurality of logic-array blocks (LABs). Each LAB may be formed from a plurality of logic blocks, carry chains, LAB control signals, (lookup table) LUT chain, and register chain connection lines. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input lookup table (LUT) with a configurable register. According to an alternate embodiment of the present invention, the logic block may operate similarly to an adaptive logic module (ALM), such as those found in Stratix devices manufactured by Altera Corporation. LABs are grouped into rows and columns across the target device 900. Columns of LABs are shown as 911-916. It should be appreciated that the logic block may include additional or alternate components.

The target device 900 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the target device in between selected LABs or located individually or in pairs within the target device 900. Columns of memory blocks are shown as 921-924.

The target device 900 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the target device 900 and are shown as 931.

The target device 900 includes a plurality of input/output elements (IOEs) 940. Each IOE feeds an IO pin (not shown) on the target device 900. The IOEs 940 are located at the end of LAB rows and columns around the periphery of the target device 900. Each IOE may include a bidirectional IO buffer and a plurality of registers for registering input, output, and output-enable signals.

The target device 900 may include routing resources such as LAB local interconnect lines, row interconnect lines ("H-type wires"), and column interconnect lines ("V-type wires") (not shown) to route signals between components on the target device.

FIG. 9 illustrates an exemplary embodiment of a target device. It should also be appreciated that, as indicated above, the target device may include the same or different semiconductor devices arranged in a different manner. The target device 900 may also include FPGA resources other than those described and illustrated with reference to the target device illustrated in FIG. 9. Thus, while embodiments of the invention described herein may be utilized on the architecture described in FIG. 9, it should be appreciated that it may also be utilized on different architectures.

In the foregoing specification, embodiments of the invention have been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for performing timing analysis on calibrated paths, comprising:
    performing static timing analysis on the calibrated paths to obtain delay and margin information; and
    utilizing the delay and margin information to emulate operations performed during calibration, wherein at least one of the performing and utilizing is performed by a processor.

2. The method of claim 1, further comprising adjusting the delay and margin information to include effects of operating condition variations during and after calibration.

3. The method of claim 1, further comprising adjusting the delay and margin information to account for external process variation.

4. The method of claim 1, wherein utilizing the delay and margin information to emulate operations performed during calibration comprises emulating operations performed in hardware.

5. The method of claim 1, wherein utilizing the delay and margin information to emulate operations performed during calibration comprises considering margin improvement by calibrations of within die variations by removing an effect of a range of delay values.

6. The method of claim 1, wherein utilizing the delay and margin information to emulate operations performed during calibration comprises accounting for effects of jitter.

7. The method of claim 1, wherein utilizing the delay and margin information to emulate operations performed during calibration comprises accounting for a worst-case calibration error to derate available margin.

8. The method of claim 1, wherein static timing analysis is performed at multiple corners to consider different operating conditions.

9. The method of claim 8, wherein the different operating conditions include process variations, voltage variations, and temperature variations.

10. The method of claim 2, wherein adjusting the delay and margin information to include effects of operating condition variations during and after calibration comprises derating the static timing analysis in response to changes in operating conditions after calibration for paths that are not tracked.

11. The method of claim 2, wherein adjusting the delay and margin information to include effects of operating condition variations during and after calibration comprises derating the static timing analysis with a tracking uncertainty in response to changes in operating conditions after calibration for paths that are tracked.

12. The method of claim 3, wherein adjusting the delay and margin information to account for external process variation comprises:
    determining a percentage of external specification that are due to process variations; and
    increasing a timing margin of a calibrated path that interfaces with an external component.

13. The method of claim 1, wherein performing static timing analysis comprises performing static timing analysis after each calibration operation to obtain delay information to decide further calibration operations.

14. The method of claim 1, wherein performing static timing analysis comprises performing static timing analysis and performing post-processing on the delay and margin information to approximate calibration.

15. The method of claim 10, wherein derating the static timing analysis in response to changes in operating conditions after calibration for paths that are not tracked further comprises:
    determining a worst case variation in delay due to operating condition variations;
    determining a largest change in delay due to calibration that does not track with other paths;
    subtracting a maximum derating factor from all timing margins as the multiplication of the worst-case variation in delay multiplied by the largest change in delay due to calibration;
    determining the correlation in changes in operating conditions between different paths; and
    subtracting a maximum correlation derating factor from all timing margins as a multiplication of the operating condition correlation between paths and the maximum derating factor.

16. The method of claim 11, wherein derating the static timing analysis with a tracking uncertainty in response to changes in operating conditions after calibration for paths that are tracked further comprises:
    determining a tracking uncertainty for each tracking algorithm; and
    removing a tracking uncertainty for all timing margins.

17. A non-transitory computer readable medium, having stored thereon sequences of instructions, the sequences of instructions when executed by a processor causes the processor to perform:
    performing static timing analysis on calibrated paths on a target device to obtain delay and margin information; and
    utilizing the delay and margin information to emulate operations performed during calibration.

18. A method for performing timing analysis on a system implemented on a target device, comprising:
    performing static timing analysis on the system;
    emulating calibration operations performed on the system by the target device; and
    adjusting delays and margin from the emulated calibration operations to more accurately characterize the emulated calibration, wherein at least one of the performing, emulating, and adjusting is performed by a processor.

19. The method of claim 18, wherein the calibration operations comprises adding or subtracting delays to a path.

20. The method of claim 18, wherein the calibration operations comprises adjusting phase locked loops (PLLs).

21. The method of claim 18, wherein emulating calibration operations comprises performing multiple iterations of static timing analysis and updating the typology of the system on the target device.

22. The method of claim 18, wherein emulating calibration operations comprises performing a single iteration of static timing analysis and updating the typology of the system on the target device.

23. The method of claim 18, wherein adjusting delays and margins comprises accounting for assumptions made by the static timing analysis.

24. The method of claim 23, wherein accounting for assumptions made by the static timing analysis using one of a minimum or maximum delay value.

25. The method of claim 18, wherein adjusting delays and margins comprises accounting for calibration uncertainty.

26. The method of claim 25, wherein accounting for calibration uncertainty comprises assuming a worst-case quantization error and removing the error from the delays and margins.

27. The method of claim 18, wherein adjusting delays and margins comprises accounting for effects of jitter.

28. The method of claim 27, wherein accounting for effects of jitter comprising removing full jitter from set up and hold margins.

29. The method of claim 18, wherein adjusting delays and margins comprises accounting for variation in voltage and temperature.

30. The method of claim 18, wherein adjusting delays and margins comprises accounting for external process variation calibration.

31. A timing analysis unit, comprising:
 a static timing analysis (STA) unit to generate delay and margin information on paths in the system;
 a calibration emulation unit to emulate calibration operations performed on the system by a target device; and
 a delay and margin adjustment unit to adjust the delay and margin information to more accurately characterize the emulated calibration.

32. The timing analysis unit of claim 31, wherein the delay and margin adjustment unit comprises an STA assumption adjustment unit to remove pessimism by using one of a minimum or maximum delay value.

33. The timing analysis unit of claim 31, wherein the delay and margin adjustment unit comprises a calibration uncertainty adjustment unit to assume a worst-case quantization error and removing the error from the delays and margins.

34. The timing analysis unit of claim 31, wherein the delay and margin adjustment unit comprises a noise effects adjustment unit to remove full jitter from set up and hold margins.

35. The timing analysis unit of claim 31, wherein the delay and margin adjustment unit comprises an operating condition change adjustment unit to account for variation in voltage and temperature.

* * * * *